(12) United States Patent
Nishihara et al.

(10) Patent No.: US 8,813,345 B2
(45) Date of Patent: Aug. 26, 2014

(54) METHOD FOR MANUFACTURING DISK DRIVE DEVICE

(75) Inventors: Kenji Nishihara, Fujieda (JP); Hirofumi Kajiwara, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 59 days.

(21) Appl. No.: 13/493,223

(22) Filed: Jun. 11, 2012

(65) Prior Publication Data

US 2012/0317794 A1 Dec. 20, 2012

(30) Foreign Application Priority Data

Jun. 14, 2011 (JP) ................................. 2011-132288

(51) Int. Cl.
  *G11B 5/41* (2006.01)
  *B08B 9/30* (2006.01)
  *G11B 25/04* (2006.01)

(52) U.S. Cl.
  CPC .......... *G11B 25/043* (2013.01); *G11B 33/1943* (2013.01)
  USPC ....... 29/603.03; 29/603.08; 29/722; 134/25.4

(58) Field of Classification Search
  USPC ......... 29/603.01–603.03, 603.08, 722; 134/1, 134/26, 25.4, 32–36; 360/99.21, 131, 265.3
  See application file for complete search history.

(56) References Cited

U.S. PATENT DOCUMENTS

| 6,843,257 | B2 * | 1/2005 | Yeo et al. ........................ 134/1.3 |
| 8,312,617 | B2 * | 11/2012 | Omura et al. .............. 29/603.03 |
| 8,516,685 | B2 * | 8/2013 | Nishihara ................. 29/603.03 |
| 2001/0001601 | A1 | 5/2001 | Foss et al. |
| 2007/0085431 | A1 | 4/2007 | Hayakawa et al. |
| 2010/0254043 | A1 | 10/2010 | Nishihara |
| 2011/0063964 | A1 | 3/2011 | Omura et al. |

FOREIGN PATENT DOCUMENTS

| JP | 2010-244627 A | 10/2010 |
| JP | 2011-123984 A | 6/2011 |

* cited by examiner

*Primary Examiner* — Minh Trinh
(74) *Attorney, Agent, or Firm* — Holtz Holtz Goodman & Chick PC (57) ABSTRACT

A method for manufacturing a disk drive device includes (a) assembling a sub assembly by assembling a bearing unit and a rotating body to a fixed body in a clean room, the rotating body being supported by the bearing unit in a freely rotatable manner to the fixed body, (b) cleaning the sub assembly by spraying a mixture of a cleaning liquid and a first gas to at least either one of the fixed body and the rotating body; and (c) enclosing the sub assembly using an enclosing member.

20 Claims, 9 Drawing Sheets

METHOD FOR MANUFACTURING DISK DRIVE DEVICE

CROSS-REFERENCE TO RELATED APPLICATION

This application claims the priority based on Japanese Patent Application No. 2011-132288 filed on Jun. 14, 2011, the entire specification, claims, and drawings of which are herein incorporated in this specification by reference.

BACKGROUND OF THE INVENTION

1. Field of the Invention

The present invention relates to a method for manufacturing a disk drive device and a disk drive device manufactured by same, and in particular, a method for manufacturing a disk drive device which reduces the amount of adhering particles and a disk drive device manufactured by same.

2. Description of the Related Art

Recently, disk drive devices like an HDD (Hard Disk Drive) need to meet requirements, such as downsizing and increasing of the capacity. For example, a disk drive device that records magnetic data rotates a recording disk having recording tracks at a high speed, and reads/writes data while causing a magnetic head to float over the recording tracks while maintaining a tiny clearance. In order to downsize such a disk drive device and increase the capacity thereof, it is necessary to make the pitch of the recording tracks narrower. Moreover, together with the narrowing down the pitch of the recording tracks, it is also examined to further narrow down the clearance between the magnetic head and the recording disk. For example, it is necessary that the clearance between the magnetic head and the recording disk is designed as an extremely tiny clearance like equal to or less than 10 nm.

Moreover, in order to downsize the disk drive device, a magneto-resistance effect element (hereinafter, referred to as an MR element) is used for the magnetic head. On the other hand, when the MR element is used in a tiny space, the magnetic head may cause a thermal asperity failure (hereinafter, referred to as a TA failure) and a head-crush failure. More specifically, a TA failure is a phenomenon in which tiny foreign materials on the surface of the recording disk contact the MR element while the magnetic head is in a floating tracing operation, and the kinetic energy of such foreign materials produces heat to the MR element momentarily, the MR element is heated or cooled instantaneously, the resistance of the MR element instantaneously changes, and the changed resistance is superimposed on a playback signal as noises, thereby disturbing an accurate reading of the playback signal.

Through the examination by the inventors of the present invention, the inventors of the present invention found that the TA failure is caused when foreign materials (hereinafter, referred to as "particles") of 0.1 μm to several μm or so adhering to the disk drive device adhere to the surface of the recording disk due to vibration, and airflow, etc. JP 2010-244627 A discloses a cleaning device that cleans various components like a base.

Even if the base, etc., is cleaned, particles may adhere to the base when components like a bearing unit and a hub are assembled. For example, the following first case can be expected in which particles adhering an assembling facility, a tool, or a hand of a worker are transferred to the disk drive device.

Moreover, the following second case can be also expected in which when a bond is used to assemble the bearing unit and the hub, etc., to the base, components contained in such a bond fly apart from the bond and adhere to the surfaces of the base, the bearing unit, and the hub as particles.

Furthermore, the following third case can be expected in which when soldering or welding, etc., is performed in order to connect electrical wirings of a drive unit, etc., particles flay apart at the time of soldering or welding, and adhere to the surfaces of the base, the drive unit and the hub as particles.

The particles adhered at the time of assembling as explained above cannot be eliminated by the conventional methods for manufacturing a disk drive device, and the level of the cleanness in the general disk drive devices is low. When the large amount of the particles remains in the interior of the disk drive device, if the clearance for floating the magnetic head is reduced, the occurrence rate of the TA failure increases, disturbing the accomplishment of the downsizing of the disk drive device and the increase of the capacity thereof.

The present invention has been made in view of such circumstances, and it is an object of the present invention to provide a technology which increases the cleanness level in a disk drive device, and which can maintain a low occurrence rate of a TA failure when a clearance between a magnetic head and a recording disk at the time of the tracing operation of the magnetic head is reduced.

SUMMARY OF THE INVENTION

To achieve the object, an aspect of the present invention provides a method for manufacturing a disk drive device, and the method includes: (a) assembling a sub assembly by assembling a bearing unit and a rotating body to a fixed body in a clean room, the rotating body being supported by the bearing unit in a freely rotatable manner to the fixed body; (b) cleaning the sub assembly by spraying a mixture of a cleaning liquid and a first gas to at least either one of the fixed body and the rotating body; and (c) enclosing the sub assembly using an enclosing member.

Another aspect of the present invention provides a method for manufacturing a disk drive device, and the method includes: (e) assembling a sub assembly by assembling a bearing unit and a rotating body to a fixed body, the rotating body being supported by the bearing unit in a freely rotatable manner to the fixed body; and (f) cleaning the sub assembly by spraying a mixture of a cleaning liquid and a first gas to at least either one of the fixed body and the rotating body.

According to such aspects of the present invention, it becomes possible to provide the disk drive device having particles reduced which adhere to the disk drive device at the time of manufacturing thereof.

DETAILED DESCRIPTION OF THE PREFERRED EMBODIMENTS

Figure 1:
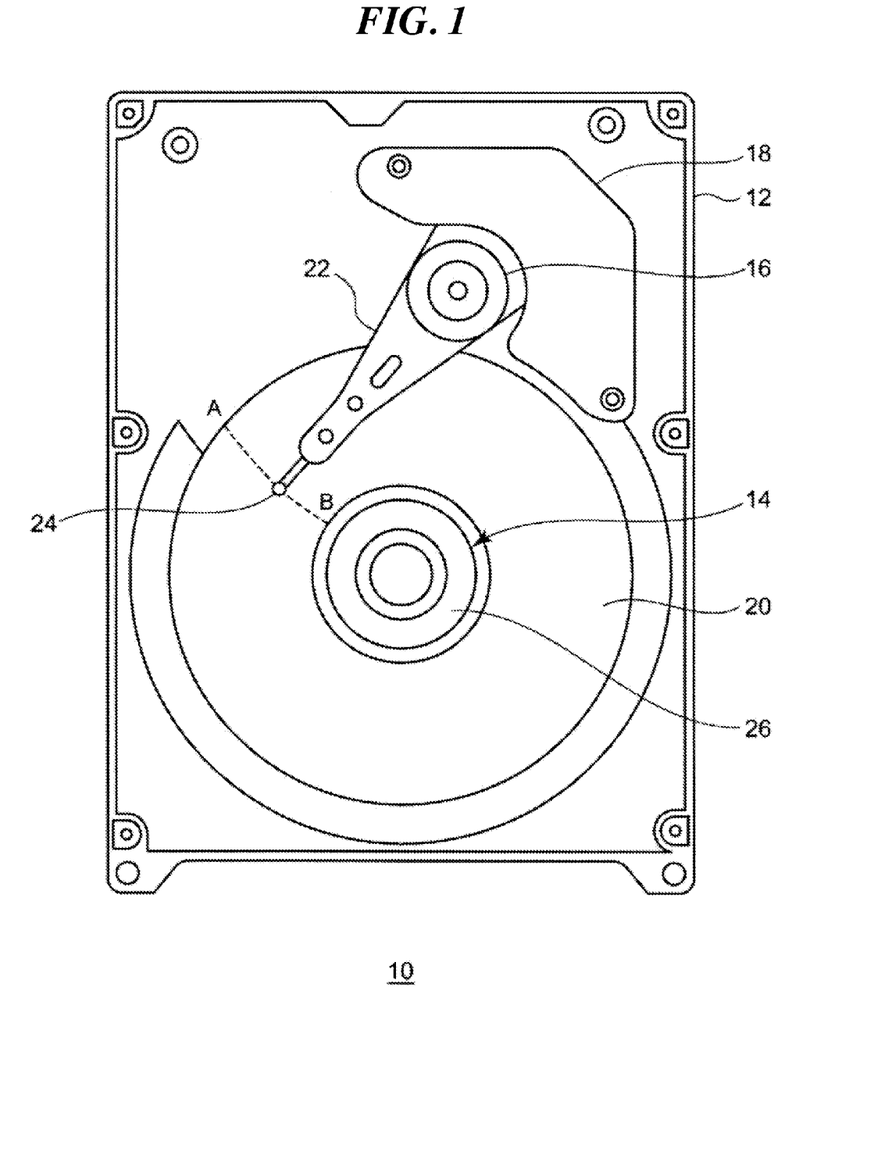
FIG. 1 is a top view of a disk drive device assembled through a disk-drive-device manufacturing method according to an embodiment of the present invention.

FIG. 1 is a top view of a disk drive device 10 assembled through a disk-drive-device manufacturing method according to an embodiment of the present invention. FIG. 1 shows a condition in which a top cover is detached in order to let the internal structure exposed. In this figure, an HDD (Hard Disk Drive) that is an illustrative disk drive device 10 is shown.

The disk drive device 10 includes a base member 12, a drive unit 14, an arm bearing unit 16, a voice coil motor 18, a recording disk 20, a swing arm 22, a magnetic head 24 and a hub 26. Mounted on the upper face of the base member 12 are the drive unit 14, the arm bearing unit 16, and the voice coil motor 18, etc. The recording disk 20 is capable of magnetically recording data. The recording disk 20 is mounted on the hub 26.

The drive unit 14 supports the hub 26, and rotates and drives the recording disk 20. The drive unit 14 is, for example, a spindle motor. The arm bearing unit 16 supports the swing arm 22 in a freely swingable manner. The voice coil motor 18 causes the swing arm 22 to swing in accordance with control data from the exterior. The magnetic head 24 is attached to the tip of the swing arm 22. The magnetic head 24 moves within a movable range AB.

When the disk drive device 10 is in an operation, the magnetic head 24 moves within the movable range AB on the surface of the recording disk 20 via a tiny clearance therewith in accordance with the swing of the swing arm 22, and reads/writes data.

Figure 2:
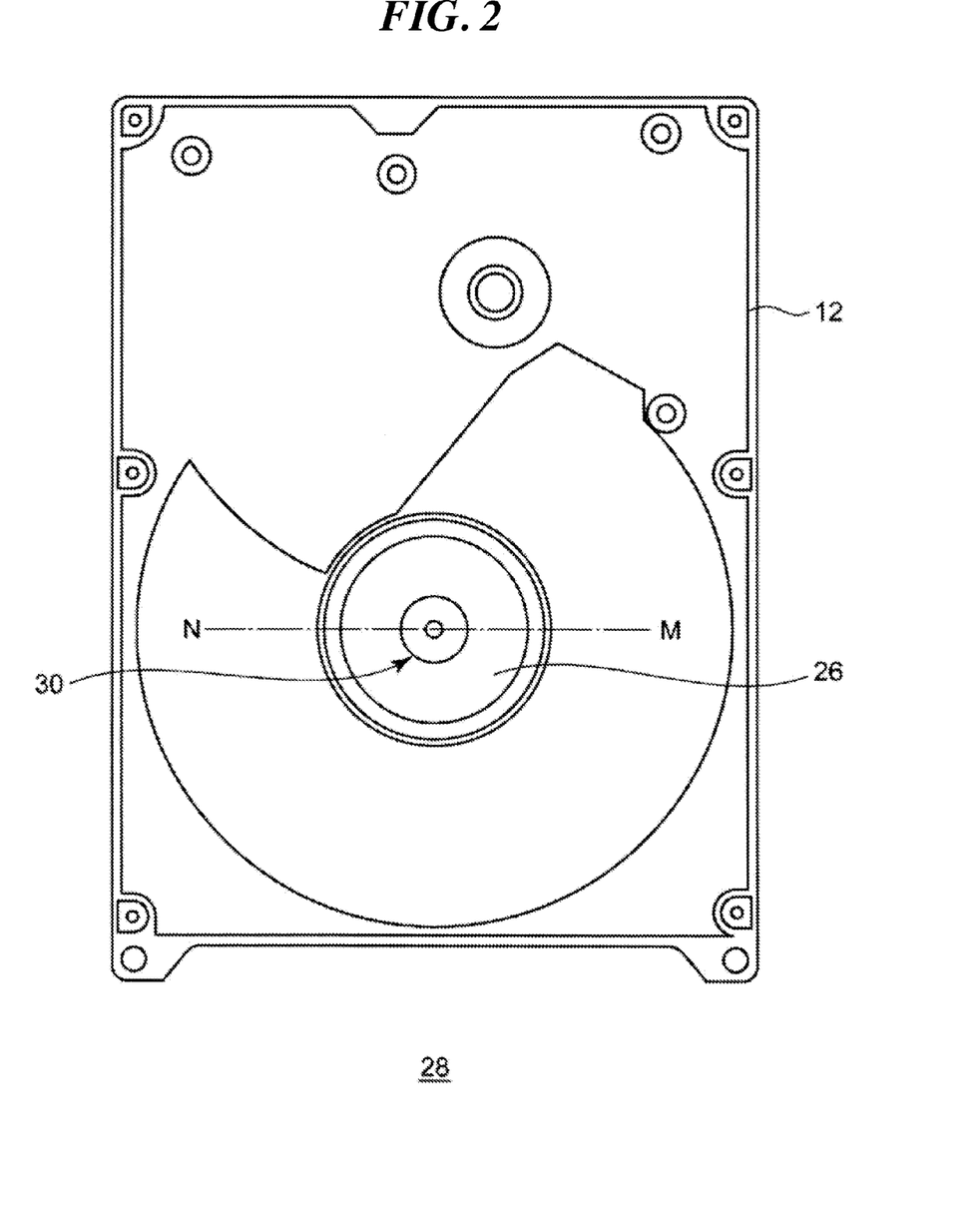
FIG. 2 is a top view showing a sub assembly of the disk drive device according to the embodiment.

FIG. 2 is a top view showing a sub assembly 28 of the disk drive device 10 according to the embodiment. The sub assembly 28 is subjected to cleaning. The sub assembly 28 is the disk drive device 10 in a condition in which a bearing unit 30, and the hub 26, etc., are attached to the base member 12, and the voice coil motor 18, and the swing arm 22, etc., are not attached yet. The recording disk 20, the magnetic head 24, the swing arm 22, the arm bearing unit 16, the voice coil motor 18 and a top cover are attached to the sub assembly 28 having undergone cleaning, thereby finishing the disk drive device 10.

Figure 3:
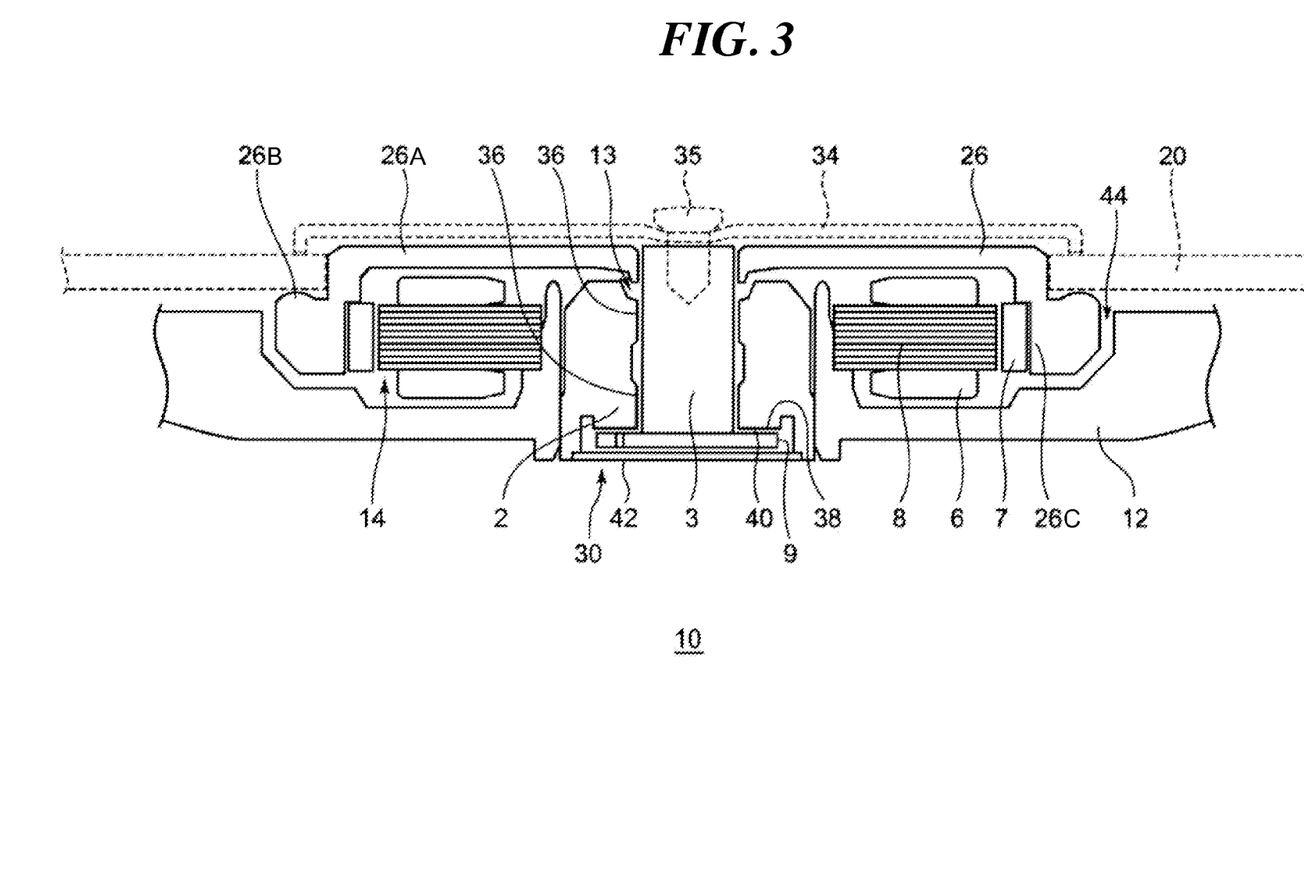
FIG. 3 is a cross-sectional view showing a part of the disk drive device according to the embodiment.

FIG. 3 is a cross-sectional view showing a part of the disk drive device 10 of this embodiment. FIG. 3 shows a cross section taken along a cut line M-N in FIG. 2. FIG. 3 shows a structure of a shaft-rotating type disk drive device 10 having the hub 26 and the shaft 3 rotating together. The disk drive device 10 further includes the bearing unit 30. The sub assembly 28 includes a fixed body, the bearing unit 30, and the rotating body which is supported by the bearing unit 30 in a freely rotatable manner relative to the fixed body. Note that a part indicated by the dashed line in the figure is a member that is not attached to the sub assembly 28 yet.

The fixed body includes the base member 12, a stator core 8, coils 6, a sleeve 2, and a counter plate 42. A cylinder part protruding upwardly is formed at the substantial center of the base member 12. The base member 12 is formed by, for example, cutting a work manufactured by aluminum die casting. More specifically, an epoxy resin is applied to the work formed by aluminum die casting, and a portion needing a dimensional accuracy is cut. The base member 12 supports the hub 26 in a freely rotatable manner via the bearing unit 30.

The sleeve 2 is formed in a cylindrical shape, and is fixed to the internal wall of the cylinder part of the base member 12. The counter plate 42 in a disk shape is fixed to an end of the sleeve 2 to seal the bottom of the base member 12 so as to prevent a lubricant from leaking out to the exterior from the sleeve 2.

The stator core 8 includes an annular part and a plurality of protrusions extending from the annular part outwardly of the radial direction. The stator core 8 is fixed to the outer wall of the cylinder part of the base member 12. The stator core 8 is formed by laminating a plurality of magnetic sheet metals like silicon steel plates, and applying an insulative coating on the surface thereof by electrodeposition coating or powder coating, etc. Moreover, the stator core 8 is a ring member having the plurality of protrusions protruding outwardly of the radial direction. The coils 6 of three phases are each wound around each protrusion of the stator core 8. Note that an end of the winding forming the coil 6 is electrically connected to a wiring (unillustrated) disposed on the bottom of the base member 12.

The rotating body includes the hub 26, the shaft 3, a flange 9, and a magnet 7. The hub 26 is a member formed in a substantially cup shape, and the recording disk 20 is to be mounted thereon.

The hub 26 is formed by machining an iron-steel material with soft magnetism like pressing or cutting. The hub 26 includes a disk part 26a coaxial with the center hole, and an extensive part 26b extending outwardly of the radial direction from the lower end of the outer periphery of the disk part 26a. A circumferential space 44 opened to the exterior is formed between the base member 12 and the hub 26.

Providing that the bare material of the hub 26 before machining is referred to as a work, the hub 26 can be formed by cutting and machining the work by a lathe while clamping the work to a rotational shaft and rotating the work. In order to reduce a time for cutting and machining, a machining technique is known which clamps the work at high pressure so as to allow the work to withstand against cutting and machining at a fast rotating speed. When, however, the work is clamped at high pressure, the work elastically deforms due to such high pressure. For example, when the work is clamped using a clamper with five crows, the work is elastically deformed into a shape having five vertices in accordance with the shapes of the five crows. When the work having undergone elastic deformation is cut and machined to a predetermined dimension accuracy, the work released from the clamp after machining causes reverse deformation by what corresponds to the elastic deformation from the shape with the predetermined dimension accuracy. That is, the dimension accuracy of the work after machining decreases depending on the pressure by the clamp. More specifically, when the work is clamped at high pressure and the extensive part 26b is machined, the extensive part 26b becomes a wavy shape in the circumferential direction after machining. When the extensive part 26b is wavy, the recording disk 20 to be mounted on the extensive part 26b is deformed, resulting in the increase of the read/write error rate of data. Conversely, when the pressure by the clamp is set to be low, and the whole work is machined, it is typical to set the rotating speed of the lathe to be slow, and the total machining hours increase, thereby reducing the manufacturing efficiency. In order to address this technical issue, the hub 26 may be clamped to the rotational shaft of the lathe, the extensive part 26b may be cut and machined successively with the disk part 26a, and the pressure of the clamp when the extensive part 26b is machined may be lower than the pressure of the clamp when the disk part 26a is machined. This reduces the decrease of the dimension accuracy of the extensive part 26b due to the pressure by the clamp, and also suppresses the increase of the machining hours.

A clamper 34 in a doughnut shape is fixed to the hub 26 by a screw 35. The recording disk 20 in a doughnut shape is to be mounted on the extensive part 26b. The clamper 34 is mounted on the mounted recording disk 20, and the recording disk 20 is fastened. That is, the clamper 34 and the screw 35 function as a latching part of the recording disk 20.

The magnet 7 in a ring shape is fixed to an internal wall 26c of the extensive part 26b. The magnet 7 is formed of, for example, an Nd—Fe—B (neodymium-iron-boron) based material, and rust proofing by electrodeposition coating or spray coating is applied on the surface thereof. For example, the inner periphery of the magnet 7 is magnetized to 12 magnetic poles.

The shaft 3 is inserted in the sleeve 2. An upper end of the shaft 3 is fixed to the center hole of the hub 26, and a lower end of the shaft 3 is fixed to the flange 9 in a disk shape. The flange 9 is disposed in a flange retaining space defined by the sleeve 2, and the counter plate 42. The shaft 3 is formed of a stainless-steel material like JIS SUS420J2.

The bearing unit 30 includes the shaft 3, the flange 9, the sleeve 2, and the counter plate 42. The bearing unit 30 includes a radial dynamic bearing part, a thrust dynamic bearing part, and a capillary seal 13. The radial dynamic bearing part includes a radial dynamic pressure groove 36 and a lubricant. The thrust dynamic bearing part includes a thrust dynamic pressure groove 40 and the lubricant. The radial dynamic pressure groove 36 is formed in a herringbone shape, and is formed separately in the inner periphery of the sleeve 2 in the vertical direction. Moreover, the thrust dynamic pressure groove 40 is formed in a herringbone shape or in a spiral shape, and is formed in a surface of the flange 9 facing a lower face 38 of the sleeve 2 and a surface of the flange 9 facing the counter plate 42.

The capillary seal 13 is provided at an opened end side above the sleeve 2, and is formed in such a way that a clearance between the inner periphery of the sleeve 2 and the outer periphery of the shaft 3 gradually becomes wider toward the upper opened end. A space defined by the radial dynamic pressure groove 36, the thrust dynamic pressure groove 40, the capillary seal 13 and a surface facing the capillary seal 13 is filled with the lubricant like an oil. The capillary seal 13 prevents the lubricant from leaking out by a capillary phenomenon.

When the shaft 3 rotates, the radial dynamic pressure groove 36 produces radial dynamic pressure, and because of the produced radial dynamic pressure, the lubricant supports the rotating body in the radial direction. Moreover, when the flange 9 rotates, the thrust dynamic pressure groove 40 produces thrust dynamic pressure acting on the lubricant, and the lubricant supports the rotating body in the thrust direction. The bearing unit 30 is a so-called fluid dynamic bearing, and the dynamic pressure generating function may be disturbed when a cleaning liquid, etc., to be discussed later is mixed with the lubricant.

The drive unit 14 includes the stator core 8, the coils 6, and the magnet 7. When a drive current of three phases is applied to the coils 6 from a predetermined drive circuit, the coils 6 generate rotational magnetic fields. Rotational drive force is generated by a mutual action of the driving magnetic poles of the magnet 7 and the rotational magnetic fields generated by the coils 6, and thus the rotating body rotates.

Figure 4:
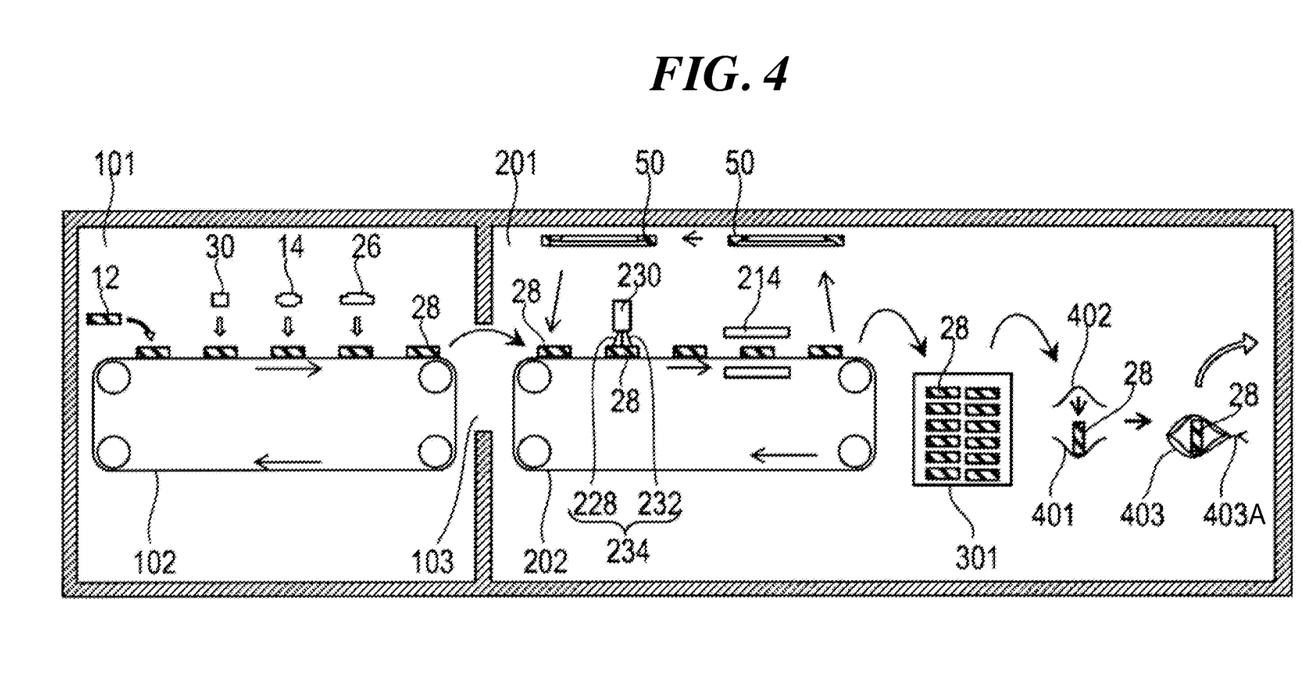
FIG. 4 is a diagram showing respective steps of the disk-drive-device manufacturing method according to the embodiment.

FIG. 4 is a diagram showing respective steps of the method for manufacturing the disk drive device 10 according to the first embodiment. In FIG. 4, the processes progress from the left of the figure to the right thereof. The method for manufacturing the disk drive device 10 generally includes assembling the bearing unit 30 having the fixed body filled with the lubricant with the rotating body in a first clean room 101 to assemble the sub assembly 28, cleaning the sub assembly 28 in a second clean room 201, and sealing the sub assembly 28 by a sealing member. Respective steps will be explained in detail below.

The assembling is carried out in the first clean room 101. The cleaning is carried out in the second clean room 201. Respective clean rooms are filled with clean air. The first and second clean rooms 101 and 201 are communicated with each other through a communication opening 103. The sub assembly 28 is moved from the first clean room 101 to the second clean room 201 through the communication opening 103. The first and second clean rooms 101 and 201 may be in a positive pressure condition with respect to the external atmosphere. The atmosphere of the first clean room 101 may be in a positive pressure condition with respect to the atmosphere of the second clean room 201. This prevents the cleaning liquid having undergone gasification from flowing into the first clean room 101 from the second clean room 201. Conversely, the atmosphere of the second clean room 201 may be in a positive pressure condition with respect to the atmosphere of the first clean room 101. This prevents particles produced in the first clean room 101 from flowing into the second clean room 201.

The first clean room 101 is provided with a conveyer device 102 like a belt conveyer. The base material 12, the bearing unit 30, the hub 26, and the drive unit 14, etc., are carried in the first clean room 101 through a carry-in entrance (unillustrated).

In the assembling, the bearing unit 30, the drive unit 14, and the hub 26 are attached to the base member 12 in this order to assemble the sub assembly 28. At this time, there is a possibility that particles adhere to the fixed body and the rotating body. When, for example, soldering and bonding are applied, inorganic particles originating from the soldering and hydrocarbon-based particles originating from the bond may adhere to the fixed body and the rotating body of the sub assembly 28. Next, the sub assembly 28 is conveyed to the second clean room 201 by the conveyer device 102. The sub assembly 28 is transferred from the conveyer device 102 to a conveyer device 202.

The second clean room 201 is provided with the conveyer device 202 like a belt conveyer. In the cleaning, a mixture 234 of a cleaning liquid 228 and a first gas 232 is sprayed to at least either one of the fixed body and the rotating body to clean the sub assembly 28 while the sub assembly 28 is being conveyed by the conveyer device 202. The cleaning liquid 228 is pressurized and ejected as sprays from an opening of a first nozzle 230. An example cleaning liquid 228 available is pure water. When the pure water is used, there is an advantage that no rinsing is necessary after cleaning. Alternatively, a cleaning liquid containing a surface acting agent or a hydrocarbon-based cleaning liquid containing hexane can be used as the cleaning liquid 228. Those are advantageous since those cleaning liquids have a good detergency against particles.

Various gases can be used as the first gas 232. For example, clean air can be used. Since the clean air hardly contains particles, it is advantageous that the possibility of contaminating the sub assembly 28 is little. Moreover, a gas containing gases other than air to decrease the content percentage of oxygen may be used as the first gas 232. For example, when nitrogen is used as the first gas 232, it hardly contains oxygen, and thus oxidation of the sub assembly 28 and the manufacturing facilities can be prevented. In the cleaning of this embodiment, the pure water and the clean air are used as the cleaning liquid 228 and the first gas 232, respectively. The mixture 234 of the pure water and the clean air is sprayed to at least either one of the fixed body and the rotating body to clean the sub assembly 28 while the sub assembly 28 is being conveyed by the conveyer device 202.

In the cleaning, since the mixture 234 of the cleaning liquid 228 and the first gas 232 is sprayed to the sub assembly 28 to clean the sub assembly 28, large kinetic energy can be applied to the cleaning liquid 228. The kinetic energy of the grains of the cleaning liquid can be calculated by the square product of the mass of the grain of the cleaning liquid by a velocity. Accordingly, by adjusting the grain diameter of the grains of the cleaning liquid and the blowing speed, i.e., the compression degree of the first gas to be mixed, the kinetic energy can be adjusted. For example, when the pure water is used as the cleaning liquid and the air is used as the first gas, it is confirmed through a test that particles with a relatively large mass can be eliminated within a relatively short time by cleaning the sub assembly 28 with the grain diameter of the grains of the cleaning liquid being set to be 20 to 80 μm, and the blowing speed of the cleaning liquid grains being set to be 20 to 80 m/s. Moreover, elimination of the particles can be accelerated if the sub assembly 28 is cleaned with the blowing speed of the cleaning liquid grains being set to be 100 to 300 m/s.

Figure 5:
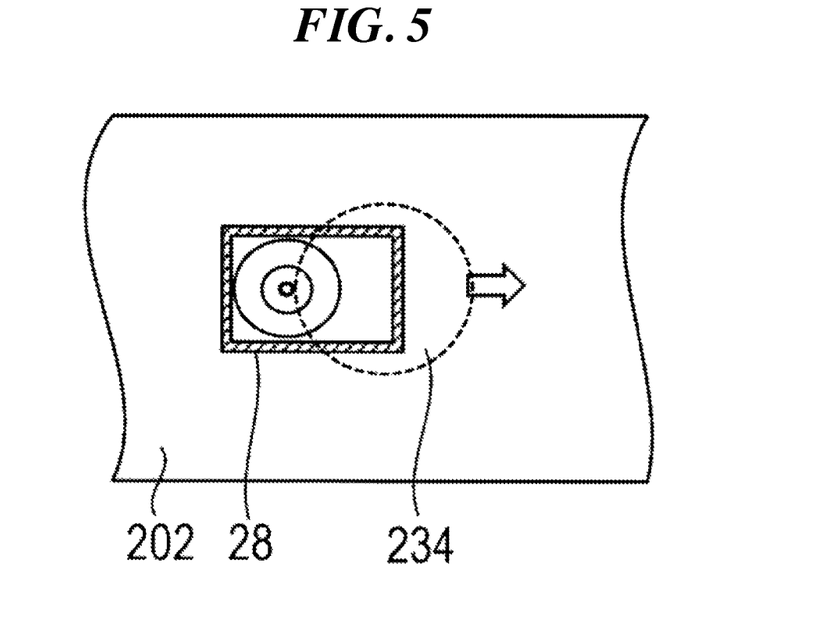
FIG. 5 is a plan view showing a cleaning step of the disk-drive-device manufacturing method according to the embodiment.

When the cleaning is performed with the opening of the first nozzle 230 that discharges the mixture 234 and the sub assembly 28 being fixed relative to each other, the amount of the spraying of the mixture 234 becomes little at an area distant from the opening, and it takes a time to eliminate the particles. FIG. 5 is a plan view showing the cleaning step of the disk-drive-device manufacturing method according to this embodiment. According to the embodiment shown in FIG. 5, the mixture 234 is sprayed while the sub assembly 28 is being conveyed by the conveyer device 202. That is, even if the opening of the first nozzle 230 has a fixed position, the mixture 234 is sprayed to the sub assembly 28 while the sub assembly 28 is being moved relative to such an opening. Accordingly, the spraying amount of the mixture 234 becomes uniform along the moving direction of the sub assembly 28, and thus the mixture 234 can be sprayed uniformly across the wide area of the sub assembly 28. This results in an efficient elimination of the particles, thereby improving the manufacturing efficiency.

It is fine if the sub assembly 28 is fixed but the mixture 234 is sprayed thereto while the opening of the first nozzle 230 is being moved, and the mixture 234 may be sprayed while both sub assembly 28 and opening of the first nozzle 230 are being moved relative to each other. For example, the sub assembly 28 may be moved and the mixture 234 may be sprayed thereto while the first nozzle 230 is being reciprocated in a direction orthogonal to the moving direction of the sub assembly 28. This makes the spraying amount of the mixture 234 further uniform, and thus the manufacturing efficiency further improves.

Figure 6:
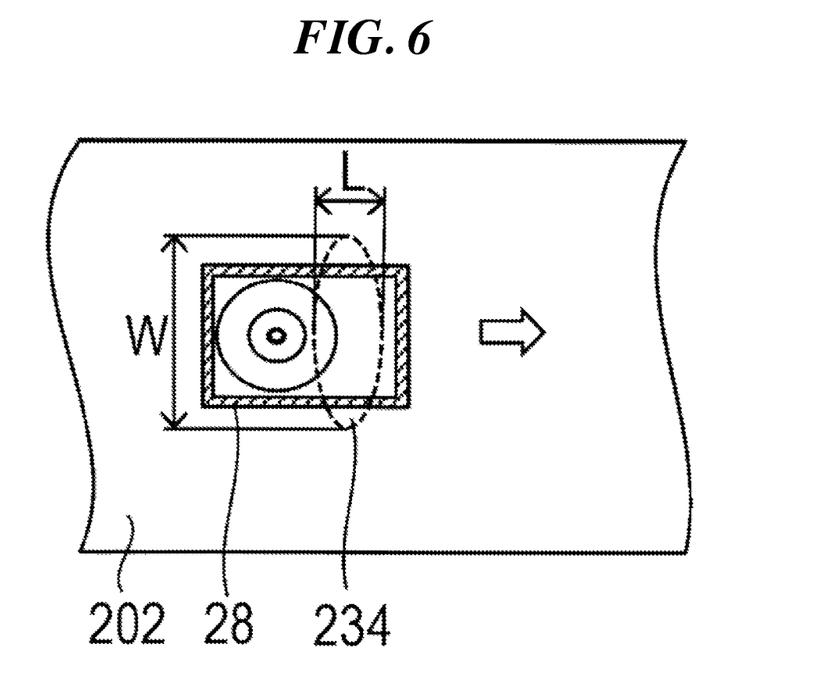
FIG. 6 is a plan view showing the cleaning step of the disk-drive-device manufacturing method according to the embodiment.
Figure 7:
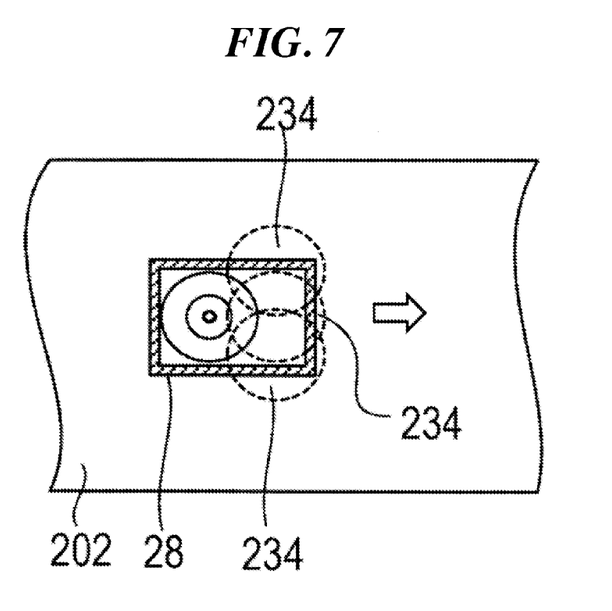
FIG. 7 is a plan view showing the cleaning step of the disk-drive-device manufacturing method according to the embodiment.

Next, an explanation will be given of a cross-sectional shape of a mixture beam that is a flow of grains of the mixture 234 with reference to FIGS. 5, 6 and 7. The cross-sectional shape of the mixture beam is indicated by dashed lines in those figures. FIG. 5 shows an example case in which the cross-sectional shape of the mixture beam is substantially circular. FIG. 6 shows an example case in which the cross-sectional shape of the beam of the mixture 234 is substantially oval. In the example case shown in FIG. 6, the cross-sectional shape of the beam of the mixture 234 is substantially oval having a width W in the direction vertical to the moving direction of the sub assembly wider than a width L of the moving direction. Moreover, a plurality of beams of the mixture 234 may be discharged in a lined-up manner. FIG. 7 shows an example case in which three beams of the mixture 234 are discharged in a lined-up manner in the direction vertical to the moving direction. In the example case shown in FIG. 7, three nozzles are disposed side by side in the direction vertical to the moving direction of the sub assembly, and substantial three circles are partially overlapping with each other. In the example cases shown in FIGS. 6 and 7, the spraying amount of the mixture 234 is made uniform in the direction vertical to the moving direction. As a result, the particles are efficiently eliminated, thereby improving the manufacturing efficiency. However, when the number of the nozzles is large, the facility becomes large. It is confirmed that there is no problem in practice in the dimension of the facility within a range where the number of the nozzle is equal to or smaller than 10.

In the cleaning, if the opening of the first nozzle 230 discharging the mixture 234 is too distant from the sub assembly 28, the kinetic energy of the mixture 234 per unit area decreases, and thus it takes a time to eliminate the particles. Conversely, when the opening of the first nozzle 230 is too close to the sub assembly 28, the nozzle may hit the sub assembly 28 and damage the sub assembly 28. According to this embodiment, the opening of the nozzle is provided at a position that maintains a minimum distance from the sub assembly 28 to be 2 to 50 mm. It is confirmed that the possibility of damaging the sub assembly 28 is little in practice and the particles can be efficiently eliminated.

In the cleaning, when the cleaning time is too short, the amount of remaining particles increases. Conversely, when the cleaning time is too long, the manufacturing efficiency decreases. The cleaning time in the cleaning is substantially proportional to a value of X/V that is a product of a length X (mm) of the moving direction of the sub assembly 28 by an inverse value of a relative moving speed V (mm/s). The X/V value is set through a test in such a way that the amount of the remaining particles becomes equal to or lower than a desired level. It is confirmed that the amount of the remaining particles can be reduced to equal to or lower than the desired level while mainlining a good manufacturing efficiency in practice if the X/V value is within a range from 10 to 60 (s). In this embodiment, X=140 (mm) and V=3.5 to 7 (mm/s), and the X/V value is set to be 20 to 40 (s). It becomes possible to reduce the varying of the amount of the remaining particles without a reduction of the manufacturing efficiency. Moreover, when the X/V value is set to be shorter than the manufacturing cycle time of the sub assembly 28, the manufacturing efficiency further improves.

After the cleaning, the sub assembly 28 is moved to a water repelling device 214. The water repelling device 214 blows the sub assembly 28 with warm air of clean air to repel the moisture adhering on the surface of the sub assembly 28. The temperature of the warm air is set through a test with a blowing time and the desired level of water repelling being as parameters. According to this embodiment, the temperature of the warm air is set to be 30 to 60° C. This accomplishes a desired water repelling level without resulting in the decrease of the manufacturing efficiency.

Next, the sub assembly 28 is moved to a hot bath 301. The interior of the hot bath 301 is filled with clean air having a temperature maintained at 60 to 120° C. The sub assembly 28 is put in the hot bath 301 for 10 to 120 minutes, and is let dried while being heated.

When the time for putting the sub assembly 28 in the hot bath 301 is set to be equal to or longer than 10 minutes, the remaining cleaning liquid 228 can be eliminated, while at the same time, the property change of the surface of the sub assembly 28 is suppressed. Moreover, when the time for putting the sub assembly 28 in the hot bath 301 is set to be equal to or shorter than 120 minutes, the reduction of the manufacturing efficiency is suppressed. The drying time can be reduced if the internal temperature of the hot bath 301 is maintained at a temperature of equal to or higher than 60° C., and the vaporization of the lubricant can be suppressed if the internal temperature of the hot bath 301 is maintained at a temperature of equal to or lower than 120° C.

Next, the sub assembly 28 is conveyed to an enclosing step. An enclosing member includes two trays and a bag with a predetermined air-tightness. In the enclosing, the sub assembly 28 is clamped by a tray 401 and a tray 402 so as to be fully surrounded by those two trays. Next, the clamped sub assembly 28 is put in a bag 403. Thereafter, air in the bag 403 is evacuated, and an opening 403A of the bag 403 is closed. By air-tightly enclosing the sub assembly 28, it becomes possible to prevent the particles from adhering to the sub assembly 28 again.

After the enclosing, the sub assembly 28 is taken out from an outlet (unillustrated). Next, the sub assembly 28 is moved to an assembling-finishing step, and the enclosing member is detached in a third clean room (unillustrated). Thereafter, the recording disk 20, the magnetic head 24, the swing arm 22, the arm bearing unit 16, and the voice coil motor 18 are attached to the sub assembly 28. Subsequently, a top cover that covers the whole assembly is attached to the assembly in a clean space, thereby finishing the disk drive device 10.

When the mixture 234 is sprayed to the sub assembly 28, the cleaning liquid 228 may enter the interior of the sub assembly 28 from a clearance 44 between the base member 12 and the hub 26. The interior of the sub assembly 28 means a space where the drive unit 14 is disposed and which is surrounded by the hub 26 and the base material 12. In order to eliminate the cleaning liquid 228 entering the interior of the sub assembly 28, it takes a long time, and the manufacturing efficiency decreases. In order to address this technical issue, according to this embodiment, the disk-drive-device manufacturing method may include a step of attaching a detachable cover 50 to the clearance 44 between the base member 12 and the hub 26 before the cleaning. As a result, it becomes possible to prevent the cleaning liquid 228 from entering the interior of the sub assembly 28.

Figure 9:
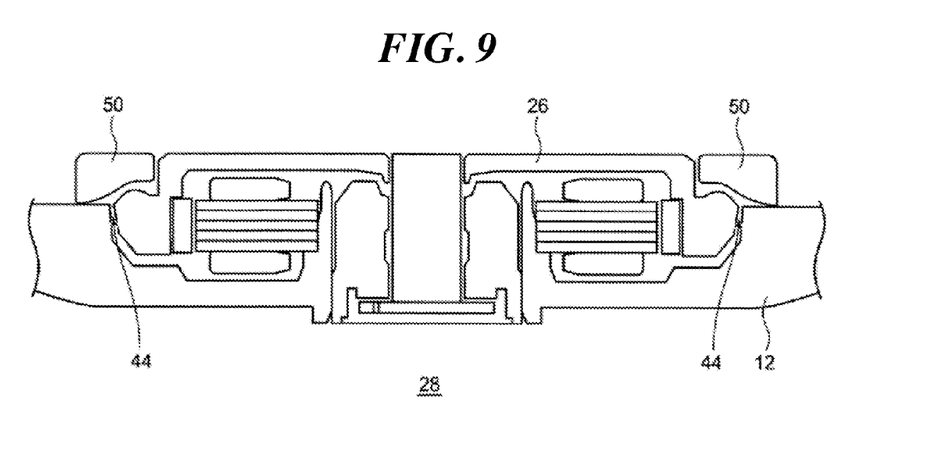
FIG. 9 is a cross-sectional view showing how the cover is attached to the sub assembly according to the embodiment.

The cover 50 may be detached from the sub assembly 28 before water repelling, but the cleaning liquid 228 may enter the interior of the sub assembly 28 through the clearance 44 between the base member 12 and the hub 26 because of the pressure of hot air. As explained above, when the cleaning liquid 228 enters the interior of the sub assembly 28, the dynamic pressure generating function may be deteriorated. Hence, according to this embodiment, the cover 50 is detached from the sub assembly 28 after water repelling. This reduces the possibility that the cleaning liquid 228 enters the interior of the sub assembly 28. The detached cover 50 is reused. The areas of the base member 12 and the hub 26 covered by the cover 50 are not cleaned. Hence, the cover 50 may be in a shape that does not cover the outer periphery cylindrical part of the hub 26. As a result, the area of the hub 26 covered by the cover 50 can be reduced. The outer periphery cylindrical part of the hub 26 is a part where the inner periphery of the center hole of the recording disk 20 is to be fitted.

Figure 8:
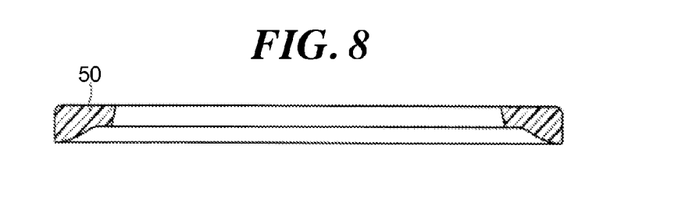
FIG. 8 is a cross-sectional view showing a cover according to the embodiment.

FIG. 8 is a cross-sectional view of the cover 50 according to this embodiment. FIG. 9 is a cross-sectional view showing how the cover 50 of this embodiment is attached to the sub assembly 28. The cover 50 is formed in an annular shape in accordance with the clearance 44. The cover 50 may be formed of a metallic material, a resin material like plastic, or a rubber material.

Figure 10:
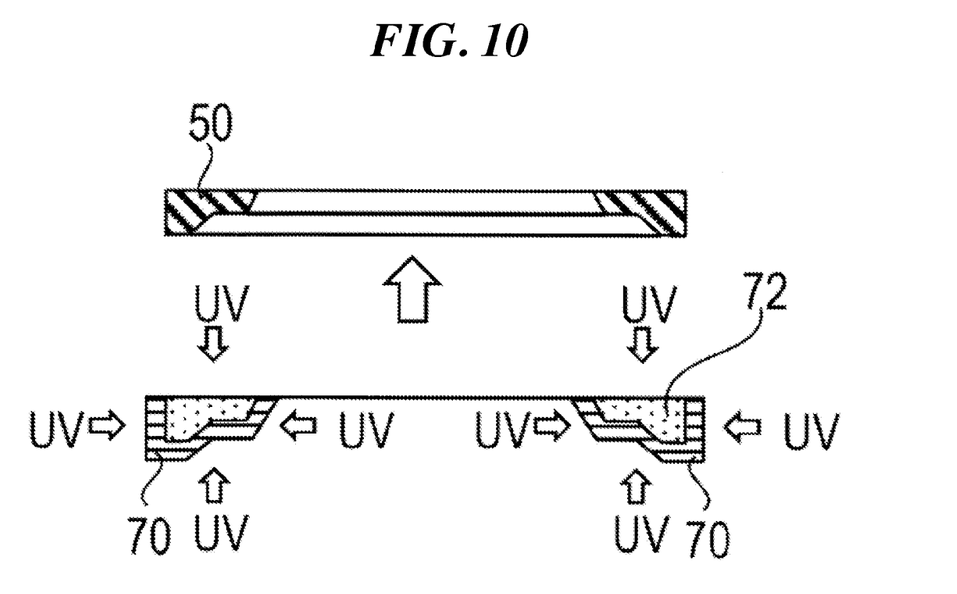
FIG. 10 is a cross-sectional view showing a method for manufacturing the cover according to the embodiment.

FIG. 10 is a cross-sectional view showing a method for manufacturing the cover 50 according to this embodiment. According to this embodiment, the cover 50 is formed by filling an ultraviolet curable resin 72 in a mold 70 formed of a plastic at least partially transparent, and emitting ultraviolet rays UV to the resin 72 from the surroundings. In the example case shown in FIG. 10, the mold 70 is formed in a substantially doughnut shape having an upper face opened, and has an annular recess corresponding to the shape of the cover 50. The mold 70 is formed of a transparent plastic, and allows ultraviolet rays UV emitted from the surroundings to go through the mold 70. The transmissive ultraviolet rays UV cause the surface of the resin 72 filled in the mold 70 to be cured. The resin 72 having the surface thereof cured is removed from the mold 70 as the cover 50. According to this embodiment, the irradiation intensity and the irradiation time of the ultraviolet rays UV are adjusted in such a way that the cover 50 has the surface having hardness capable of mainlining the shape of the cover 50, but has a gelled internal area. Since the cover 50 has a gelled internal area, the cover 50 has elasticity. Moreover, since the cover 50 is formed of a resin material having lower hardness than that of the metal forming the base member 12 and the hub 26, it is advantageous that the cover 50 hardly damages the base member 12 and the hub 26 even if the cover 50 is attached to the sub assembly 28. The cover 50 may have the internal area cured.

Various kinds of ultraviolet curable resins can be used as the resin 72. In this embodiment, an ultraviolet curable liquid resin containing urethane acrylate or epoxy acrylate of 40 to 50% and acrylate monomer of 35 to 45% is used. It is preferable since the demolding performance is good. Urethane acrylate or epoxy acrylate causes radical polymerization due to energy irradiation like ultraviolet rays, and is cured within a short time. A modifier like acrylic-acid-2-hydroxyl-ethyl of approximately 9 to 10% may be contained. Such ultraviolet curable resin has a good demolding performance.

Modified Example

Figure 11:
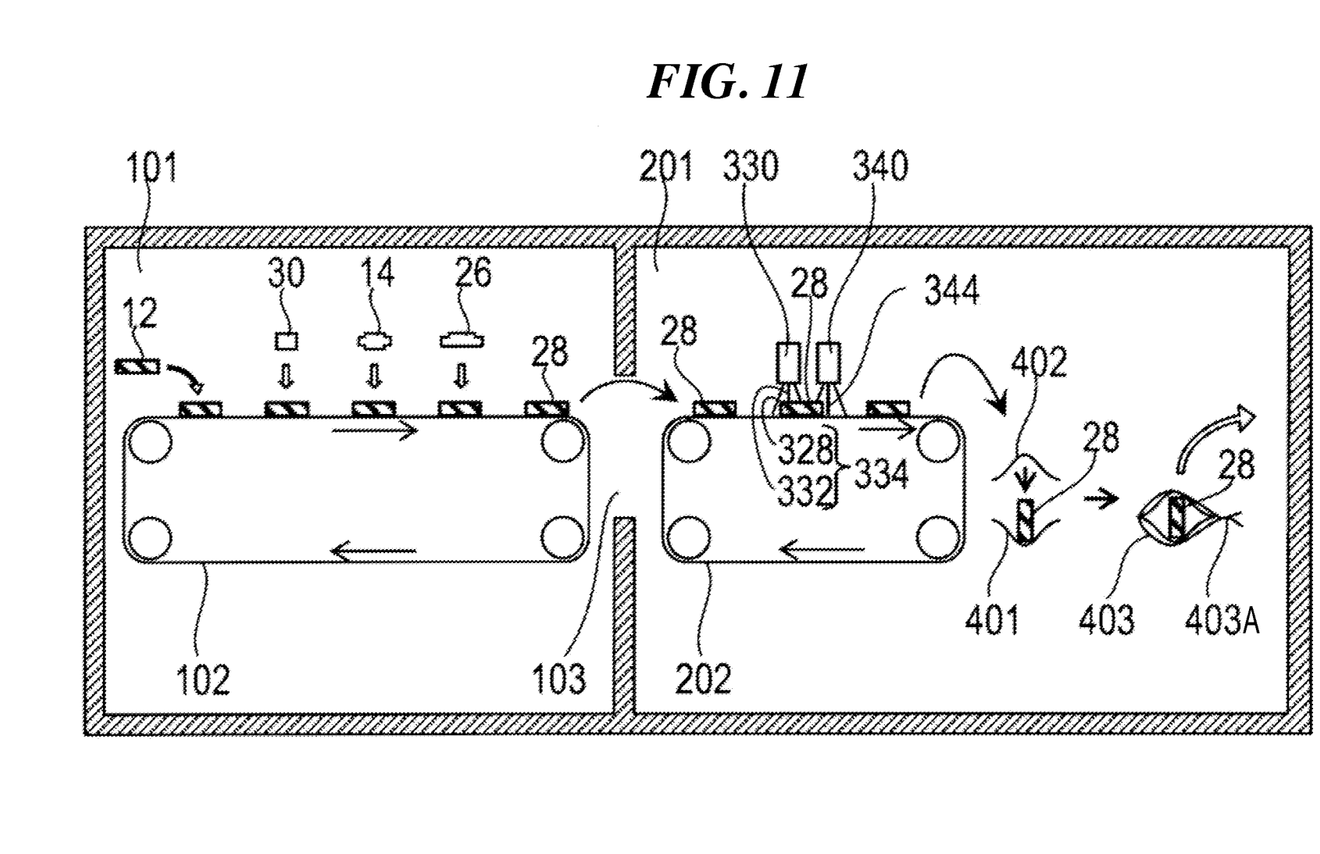
FIG. 11 is a diagram showing respective steps of a modified example of the disk-drive-device manufacturing method according to the embodiment.
Figure 12:
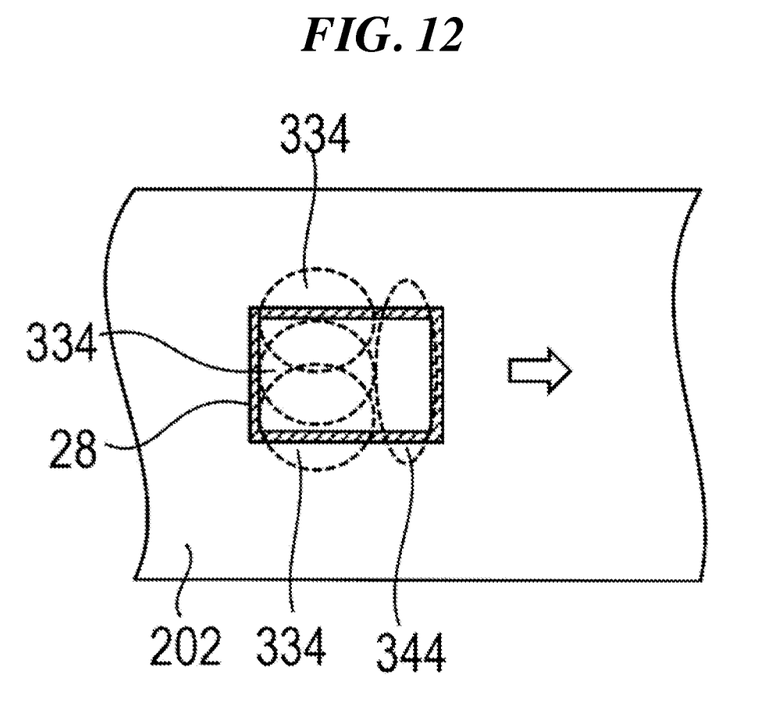
FIG. 12 is a plan view showing a cleaning step of the modified example of the disk-drive-device manufacturing method according to the embodiment.

Next, an explanation will be given of a modified example of the disk-drive-device manufacturing method of the above-explained embodiment with reference to FIGS. 11 and 12. FIG. 11 is a diagram showing a modified example of the disk-drive-device manufacturing method according to the above-explained embodiment. FIG. 12 is a plan view showing the cleaning by the modified example shown in FIG. 11. With respect to the modified example shown in FIG. 11, the explanation for the same element as that of the example shown in FIG. 4 will be omitted and the different part will be explained.

The modified example is useful when it is desirable to reduce the time necessary for eliminating the cleaning liquid. In the cleaning of the modified example, a cleaning liquid 328 contains a solvent having a boiling point of 60 to 90° C. A mixture 334 of the cleaning liquid 328 and a first gas 332 is sprayed to at least either one of the fixed body and the rotating body while the sub assembly 28 is being conveyed by a conveyer device 202 to clean the sub assembly 28. The mixture 334 is discharged and sprayed from the opening of a first nozzle 330. FIG. 12 shows an example case in which three beams of the mixture 334 are discharged in the direction vertical to the moving direction in a partially overlapping manner with each other. A gas containing clean air and nitrogen is used as the first gas 332. Various kinds of solvents can be used as the solvent contained in the cleaning liquid 328. When the boiling point of the solvent contained in the cleaning liquid 328 is high, it takes a long time to eliminate the solvent after cleaning, and the manufacturing efficiency decreases. It is confirmed that when the boiling point of the solvent is equal to or lower than 90° C., the decrease of the manufacturing efficiency is allowable in practice. Conversely, when the boiling point of the solvent is low, the solvent is easily volatized, and the frequent refilling work becomes necessary. It is confirmed that when the boiling point of the solvent is equal to or higher than 60° C., the refilling frequency is in an allowable level that does not bring about a problem in practice.

The solvent contained in the cleaning liquid 328 can be a polar solvent. When the polar solvent is used, it is advantageous to clean out polar particles. The cleaning liquid 328 may contain, for example, 2-propanol (isopropyl alcohol). 2-propanol is advantageous since it has a little possibility of remaining in the sub assembly 28 and making the sub assembly 28 discolored. 2-propanol has a remarkably small vaporization heat in comparison with water, can be easily volatilized and eliminated, and is not likely to cause moisture adhesion due to dew condensation. 2-propanol has a good cleaning property to both polar particles and non-polar particles. Moreover, the cleaning liquid 328 may be 2-propanol that contains pure water of equal to or less than 30%. Furthermore, the cleaning liquid 328 may contain a fluorinated solvent like hydrochloro-ether. Hydrochloro-ether is preferable since it is not flammable and has a low vaporization heat.

Next, the sub assembly 28 is blown by a second gas 344, and the cleaning liquid 328 adhering to the surface of the sub assembly 28 is eliminated. The second gas 344 is pressurized and discharged from the opening of a second nozzle 340. FIG. 12 shows an example case in which the second gas 344 is discharged with a cross-sectional shape substantially oval. The opening of the second nozzle 340 is located at a position distant from the opening of the first nozzle 330 by 2 to 50 mm in the moving direction of the sub assembly 28. For example, clean air or nitrogen can be used as the second gas 344.

When the sub assembly 28 and the cleaning liquid 328 are electrostatically charged, the cleaning liquid 328 may firmly adhere to the surface of the sub assembly 28 due to electrostatic force. In this case, it takes a relatively long time to eliminate the cleaning liquid 328, and the manufacturing efficiency decreases. In order to address this technical issue, a gaseous ion that is a clean gas electrostatically charged can be used as the second gas 344. When brown by the gaseous ion, the sub assembly 28 and the cleaning liquid 328 electrostatically charged are neutralized. As a result, a time necessary for eliminating the adhering cleaning liquid 328 can be reduced, thereby improving the manufacturing efficiency. An example gaseous ion is an air ion. The air ion can be supplied from an air-ion generating device. For example, the air-ion generating device applies DC or AC high voltage to electrode needles to produce corona discharge, and causes discharged electrons to collide air molecules around the air-ion generating device, thereby generating air-ions. The second gas 344 may contain nitrogen electrostatically charged.

The adhering cleaning liquid 328 often contains the particles once eliminated, and if the sub assembly 28 is simply let dried, the particles may adhere to the sub assembly 28 again. However, according to the modified example, the sub assembly 28 is blown by the second gas 344 right after being sprayed with the mixture 334, thereby blowing off the particles to prevent the particles from adhering again. Moreover, the use of the gaseous ion enables the elimination of the cleaning liquid 328 further efficiently.

When the boiling point of the solvent adhering to the sub assembly 28 is lower than that of water, when the vaporization heat is lower than that of water, and when the surface tension is smaller than that of water, the necessary work to eliminate the solvent can be reduced in comparison with the case of repelling water. As a result, the increase of the area where the manufacturing facility is installed can be prevented, thereby improving the manufacturing efficiency.

FIG. 11 shows an example case in which the sub assembly 28 is moved to the sealing after the cleaning, but the present invention is not limited to this procedure. Like the example case shown in FIG. 4, the water repelling device 214 and the hot bath 301 may be additionally used.

Other Modifications

In FIGS. 4 and 11, the explanation was given of the example cases in which the sub assembly is successively subjected to the cleaning through the assembling, but the present invention is not limited to such example cases. The surface of the sub assembly having undergone the assembling may be rubbed with a fabric material, and then the cleaning may be successively executed. For example, the surface of at least either one of the fixed body and the rotating body of the sub assembly 28 may be rubbed with a cloth containing a solvent, such as 2-propanol or hexane, to wipe off such a surface by the cloth. Accordingly, some of the particles adhering to the sub assembly can be eliminated, and thus the time necessary for the cleaning can be reduced, thereby improving the manufacturing efficiency as a whole.

The sub assembly 28 may be rubbed with a cloth in the second clean room 201 before the cleaning. This enables the elimination of the particles adhering to the sub assembly 28 while the sub assembly 28 is being moved from the first clean room 101 to the second clean room 201. According to the embodiment of the present invention, the sub assembly 28 is rubbed with a cloth in the first clean room 101 after the assembling. This is advantageous since the entry of the particles in the second clean room 201 can be prevented.

The present invention is not limited to the above-explained embodiments, and any combination of the structural elements of respective embodiments is also effective as an embodiment of the present invention. Various modifications, such as a design change apparent for those skilled in the art can be made to the above-explained embodiments, and such a modified embodiment should be also within the scope and spirit of the present invention. The structures shown in respective figures are to explain the examples, and can be changed and modified as needed as far as the same functions, advantages and effects can be accomplished.

What is claimed is:

1. A method for manufacturing a disk drive device, the method comprising:

(a) assembling a sub assembly by assembling a bearing unit and a rotating body to a fixed body in a clean room, the rotating body being supported by the bearing unit in a freely rotatable manner to the fixed body;

(b) cleaning the sub assembly by spraying a mixture of a cleaning liquid and a first gas to at least either one of the fixed body and the rotating body; and (c) enclosing the sub assembly using an enclosing member, wherein in (b) cleaning, after the mixture of the cleaning liquid and the first gas is sprayed to at least either one of the fixed body and the rotating body of the sub assembly, the sub assembly is successively blown by a second gas.

2. The method according to claim 1, wherein the second gas contains a gas electrostatically charged.

3. The method according to claim 1, wherein in (b) cleaning, the sub assembly is cleaned while the sub assembly is being moved relative to an opening of a nozzle discharging the cleaning liquid.

4. The method according to claim 3, wherein in (b) cleaning, the cleaning liquid is discharged from a plurality of nozzle openings.

5. The method according to claim 1, wherein the cleaning liquid contains a solvent having a boiling point within a range from 60 to 90° C.

6. The method according to claim 5, wherein the solvent is 2-propanol.

7. The method according to claim 1, further comprising (d) attaching a detachable cover to a clearance between the fixed body and the rotating body before (b) cleaning.

8. The method according to claim 7, wherein the cover is formed of an ultraviolet curable resin irradiated with ultraviolet rays.

9. The method according to claim 1, wherein (b) cleaning is successively executed after a surface of the sub assembly is rubbed by a fabric material.

10. The method according to claim 1, wherein in (a) assembling, the sub assembly is assembled using the bearing unit having an interior thereof filled with a lubricant.

11. The method according to claim 1, wherein
(b) cleaning is performed in a clean room different from a clean room where (a) assembling is performed, and
the clean room for (a) assembling and the clean room for (b) cleaning are in a positive pressure condition in comparison with an ambient atmosphere.

12. A method for manufacturing a disk drive device, the method comprising:

(a) assembling a sub assembly by assembling a bearing unit and a rotating body to a fixed body in a clean room, the rotating body being supported by the bearing unit in a freely rotatable manner to the fixed body;

(b) cleaning the sub assembly by spraying a mixture of a cleaning liquid and a first gas to at least either one of the fixed body and the rotating body; and (c) enclosing the sub assembly using an enclosing member, wherein in (b) cleaning, the sub assembly is cleaned while the sub assembly is being moved relative to an opening of a nozzle discharging the cleaning liquid.

13. The method according to claim 12, wherein in (b) cleaning, the cleaning liquid is discharged from a plurality of nozzle openings.

14. The method according to claim 12, wherein the cleaning liquid contains a solvent having a boiling point within a range from 60 to 90° C.

15. The method according to claim 12, further comprising (d) attaching a detachable cover to a clearance between the fixed body and the rotating body before (b) cleaning.

16. The method according to claim 12, wherein (b) cleaning is successively executed after a surface of the sub assembly is rubbed by a fabric material.

17. A method for manufacturing a disk drive device, the method comprising:

(a) assembling a sub assembly by assembling a bearing unit and a rotating body to a fixed body in a clean room, the rotating body being supported by the bearing unit in a freely rotatable manner to the fixed body;

(b) cleaning the sub assembly by spraying a mixture of a cleaning liquid and a first gas to at least either one of the fixed body and the rotating body; and (c) enclosing the sub assembly using an enclosing member, wherein the cleaning liquid contains a solvent having a boiling point within a range from 60 to 90° C.

18. The method according to claim 17, wherein the solvent is 2-propanol.

19. The method according to claim 17, further comprising (d) attaching a detachable cover to a clearance between the fixed body and the rotating body before (b) cleaning.

20. The method according to claim 17, wherein (b) cleaning is successively executed after a surface of the sub assembly is rubbed by a fabric material.

* * * * *